(12) United States Patent
Irvin et al.

(10) Patent No.: US 11,673,109 B2
(45) Date of Patent: Jun. 13, 2023

(54) APPARATUS AND METHOD FOR ENHANCING YIELD AND TRANSFER RATE OF A PACKED BED

(71) Applicant: University of Kentucky Research Foundation, Lexington, KY (US)

(72) Inventors: Bradley David Irvin, Lexington, KY (US); Kunlei Liu, Lexington, KY (US); Roger S. Perrone, Lexington, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 0 days.

(21) Appl. No.: 17/955,641

(22) Filed: Sep. 29, 2022

(65) Prior Publication Data

US 2023/0101974 A1    Mar. 30, 2023

Related U.S. Application Data

(60) Division of application No. 17/228,254, filed on Apr. 12, 2021, now Pat. No. 11,484,860, which is a continuation-in-part of application No. 16/032,648, filed on Jul. 11, 2018, now abandoned.

(60) Provisional application No. 62/530,921, filed on Jul. 11, 2017.

(51) Int. Cl.
*B01J 19/10* (2006.01)
*B01J 8/02* (2006.01)
*B01D 53/18* (2006.01)
*B01D 53/14* (2006.01)

(52) U.S. Cl.
CPC ............... *B01J 19/10* (2013.01); *B01J 8/025* (2013.01); *B01D 53/1475* (2013.01); *B01D 53/18* (2013.01); *B01J 2219/0875* (2013.01); *B01J 2219/185* (2013.01)

(58) Field of Classification Search
CPC .......... B01J 8/025; B01J 19/20; B01D 53/14; B01D 53/1475; B01D 53/18
See application file for complete search history.

(56) References Cited

U.S. PATENT DOCUMENTS

2013/0333560 A1* 12/2013 Mcculloch ......... B01D 53/1425
96/175

* cited by examiner

*Primary Examiner* — Renee Robinson
(74) *Attorney, Agent, or Firm* — Stites & Harbison PLLC; Warren D. Schickli

(57) ABSTRACT

A method of enhancing yield and transfer rate of a packed bed in a reactor chamber of a vessel includes steps of applying acoustic energy to the packed bed, measuring impedance of the packed bed deriving a natural resonance frequency of the packed bed from the measured impedance and applying the acoustic energy to the packed bed at the derived natural resonance frequency of the packed bed.

12 Claims, 18 Drawing Sheets

APPARATUS AND METHOD FOR ENHANCING YIELD AND TRANSFER RATE OF A PACKED BED

RELATED APPLICATIONS

This application is a division of U.S. Utility patent application Ser. No. 17/228,254 filed on Apr. 12, 2021, which is a continuation-in-part of U.S. Utility patent application Ser. No. 16/032,648 filed on Jul. 11, 2018, which claims priority to U.S. Provisional Patent Application 62/530,921, filed on Jul. 11, 2017, the contents of which are hereby incorporated by reference in their entirety.

TECHNICAL FIELD

The invention herein relates to application of acoustic energy in packed columns and beds in carbon capture systems to increase mass-transfer, absorption, and/or reaction rate of liquid solvents used for absorption processes.

BACKGROUND

Removal of acid gasses, such as $CO_2$, from flue gas generated in coal combustion is a topic of great societal interest. Combined efforts from the Department of Energy, researchers, and industry, both local and abroad, have yielded volumes of information on processes designed to remove $CO_2$ from coal and natural gas generated flue gas. Of the developed processes the counter current amine based absorption column with a regenerative boiler (stripper) is regarded as the best candidate for full-scale industrial $CO_2$ capture. In this process flue gas travels up an absorption column (absorber 10) while an amine based solvent travels down the column's packing material removing $CO_2$ from the flue gas. The reaction between $CO_2$ and the solvent forms carbamate and/or bicarbonate along with a protonated amine. Once the $CO_2$ is contained in the solvent, it is transferred via lines 12, 14 to a stripper 16 where it heated and the $CO_2$ is released. This creates a concentrated $CO_2$ exhaust that can be sequestered. After being stripped, the amine solvent travels back into the absorber 10 via lines 18, 20, 22 to capture more $CO_2$, creating a continuous process loop, as depicted in FIG. 1.

In response to public outcry and environmental concerns the Environmental Protection Agency is placing $CO_2$ emission restrictions on coal-fired power plants. In order to stay in operation, coal-fired plants must reduce $CO_2$ emissions. It is for this reason the market for carbon capture technologies could be enormous with over 1.5 billion tons of $CO_2$ produced annually from coal combustion in the US alone. Total market values for post-combustion $CO_2$ capture technologies could exceed $6 billion over the next 20 years giving massive potential value for desirable intellectual property.

SUMMARY

The present invention concerns a carbon capture system of an absorber with a lower gas inlet and upper gas outlet and an upper solvent inlet and a lower solvent outlet for counterflow with at least one packed bed placed in between all outlets, each packed bed comprising a sonic transducer and a packed material. The sonic transducer may be located within the packed bed or on the outside of the packed bed.

The sonic transducer produces ultrasonic energy and may produce energy between 1 to 100 kHz.

The packed bed may be randomly packed or structurally packed. The packing material may be selected from metal, polymer, fiber, wood, mineral and combinations thereof. The packed bed further may further feature activated carbon.

The present invention also includes a method for increasing mass transfer in a carbon capture system by applying sonic or acoustic energy to a packed bed in an absorber column within the carbon capture system. The applied energy may be ultrasonic energy from sonic transducers attached to the packed bed or placed within to the packed bed.

The present invention also features a method of increasing yield or transfer rate from a packed bed in a two phase reaction by applying sonic energy to a packed bed. The sonic energy can be applied by sonic transducers on the packed bed or within. The packed bed can be in a general absorption system, a distillation system, or a stripping system.

In accordance with an additional aspect, a new and improved apparatus and method are provided for enhancing the yield and transfer rate of a packed bed in a reaction chamber of a vessel. That apparatus comprises: (a) a vessel including a reaction chamber, (b) a support frame and acoustic attenuator held in the reaction chamber, (c) a packed bed, of structured, random or other packing material, carried on the support frame and acoustic attenuator, (d) at least one acoustic transducer adapted to transmit acoustic energy into the packed bed and (e) an acoustic generator having impedance matching functionality adapted to derive a natural resonance frequency of the packed bed within a frequency bandwidth of desired operation and output a driving signal to the at least one acoustic transducer at the derived resonance frequency and at a predetermined amplitude whereby yield and transfer rate from the packed bed is increased.

The method may be broadly described as including the steps of: (a) applying acoustic energy to the packed bed, (b) measuring impedance of the packed bed, (c) deriving a natural resonance frequency for the packed bed from the measured impedance and (d) applying the acoustic energy to the packed bed at the derived natural resonance frequency of the packed bed.

In one or more embodiments, the vessel may be an absorber tower and an amine based solvent and a flue gas may be circulated in counter-current flow through the packed bed. In such an embodiment, the apparatus and method serve to increase the yield and transfer rate of the packed bed thereby increasing the efficiency of carbon dioxide capture from the flue gas.

BRIEF DESCRIPTION OF THE DRAWING FIGURES

Figure 7C:
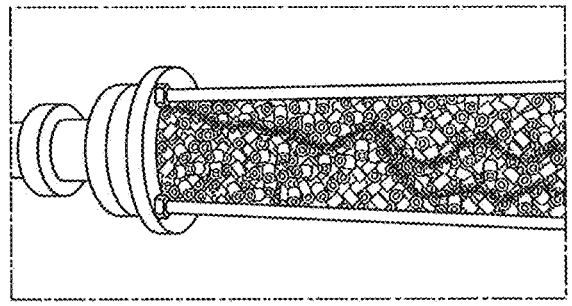
Figure 7B:
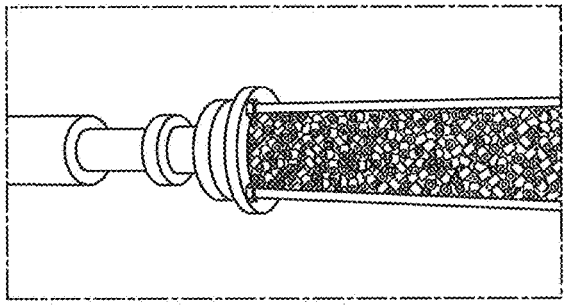
Figure 7A:
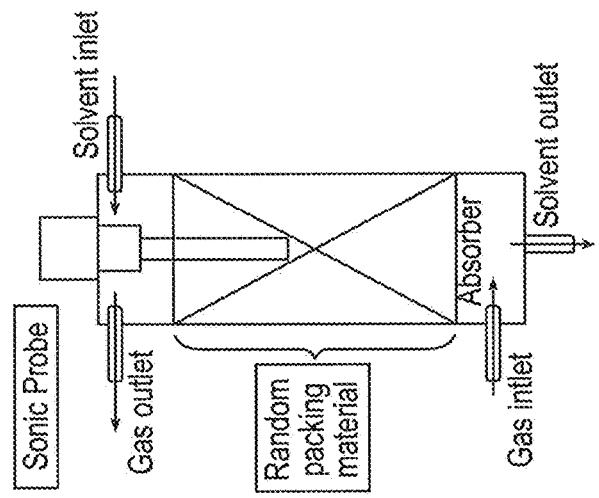

FIG. 7A is a generalized illustration of the experimental setup. FIG. 7B is a view of the absorber column which shows the probe inserted at the top. FIG. 7C shows the liquid flow through the packing material (the solvent is black from the activated carbon).

Figure 8:
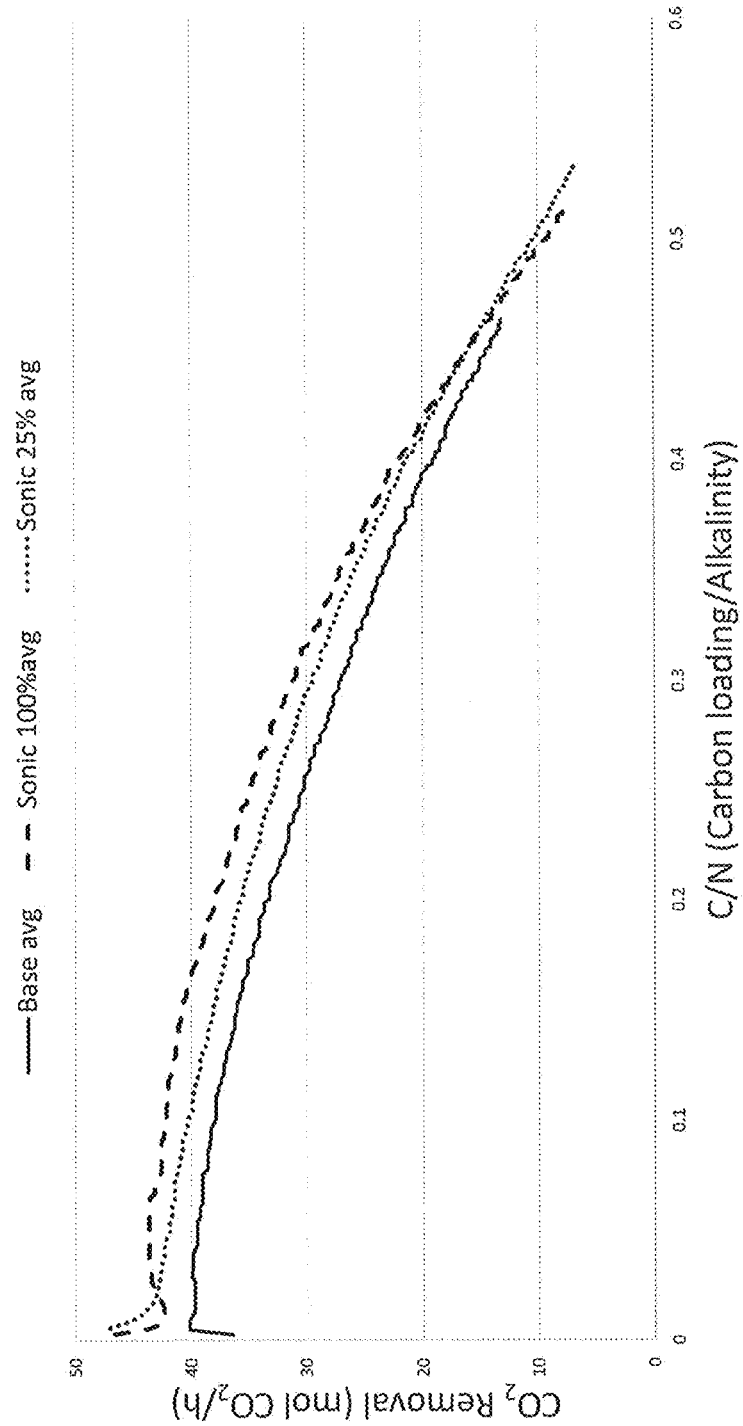

FIG. 8 shows baseline tests with MEA (no additives) and sonication.

Figure 9:
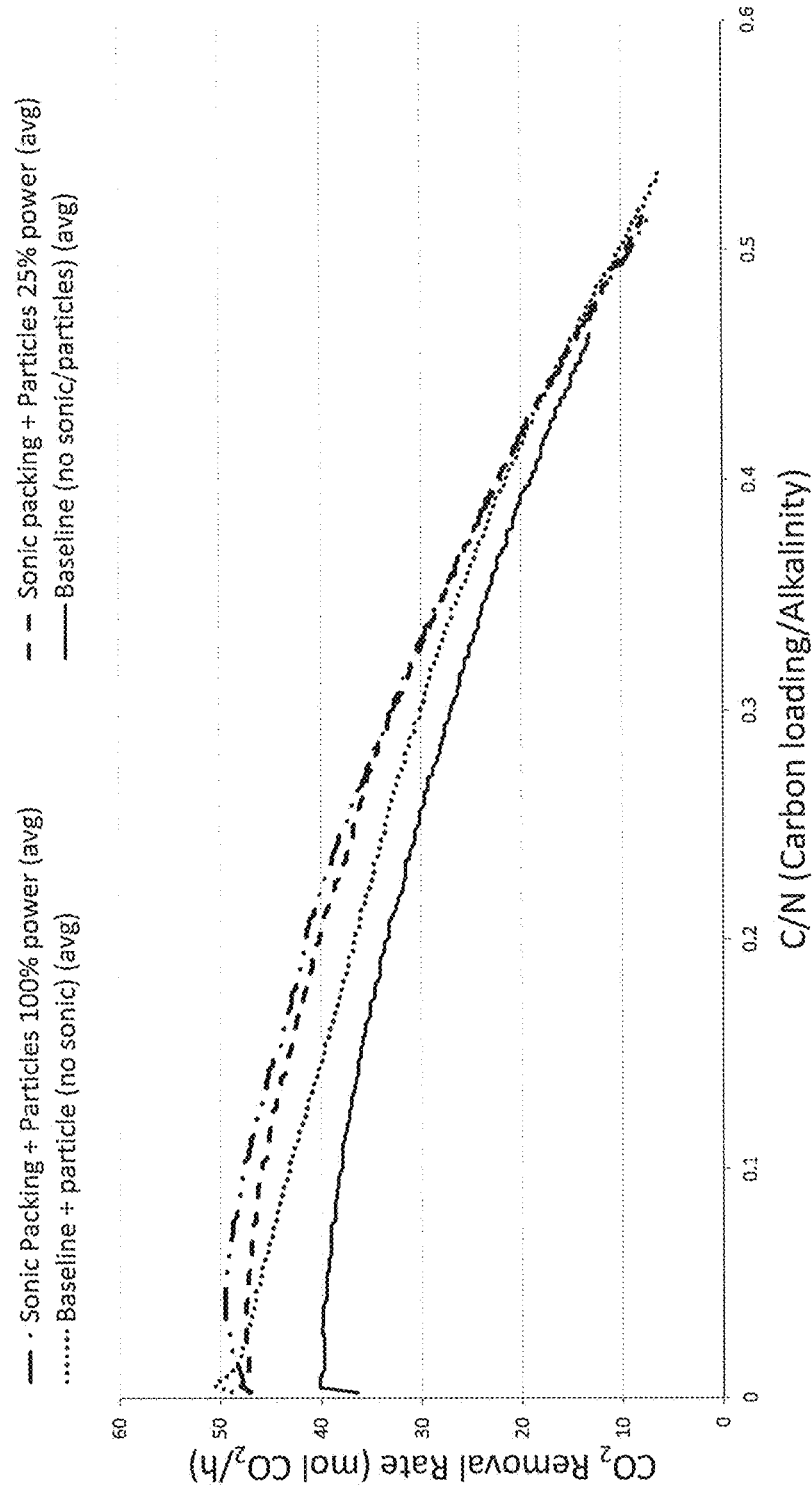

FIG. 9 shows a comparison of MEA (with activated carbon particles additive) with and without sonication to the baseline measurements.

Figure 10:
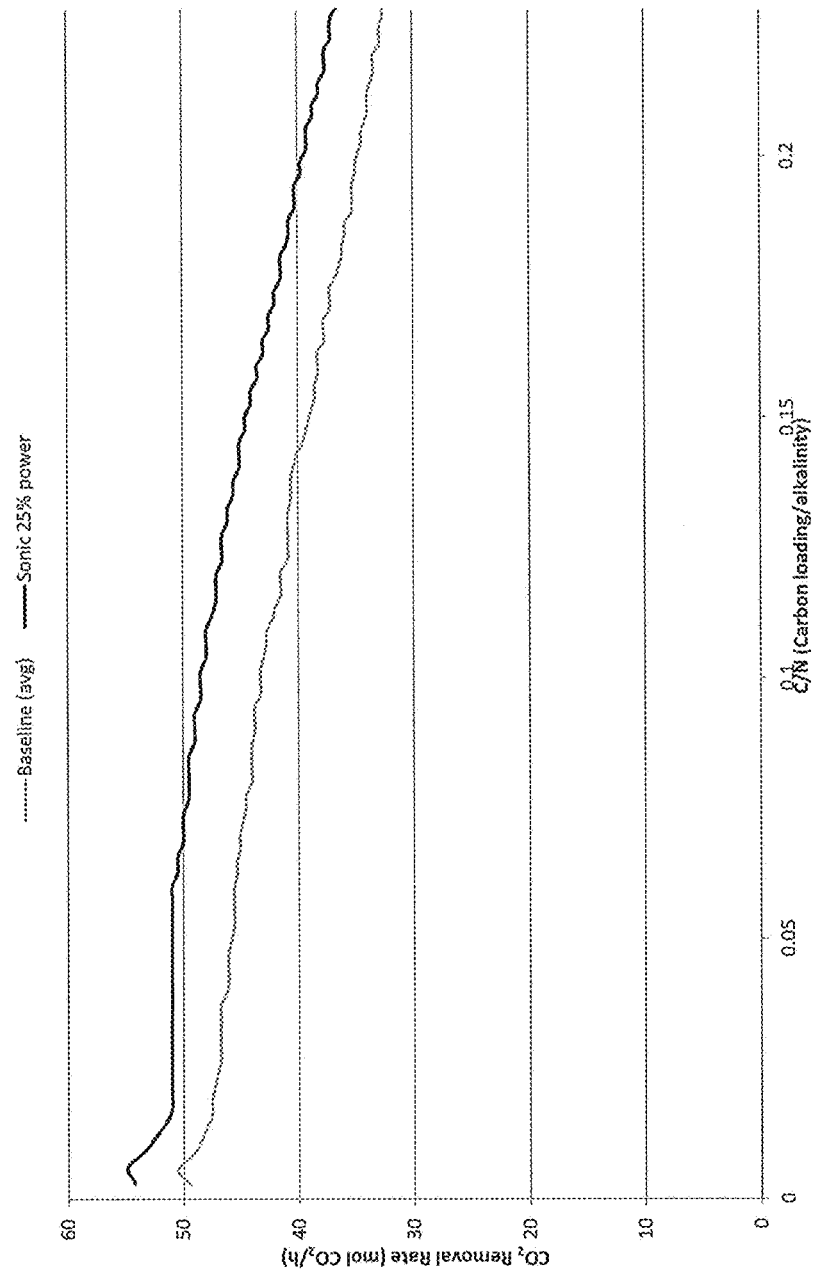

FIG. 10 shows that mass-transfer was increased in a solvent using sonic packing. The sonic probe was set to 187 W (minimum power). The removal rate was increased by 11%, as predicted from previous experiments.

Figure 11:
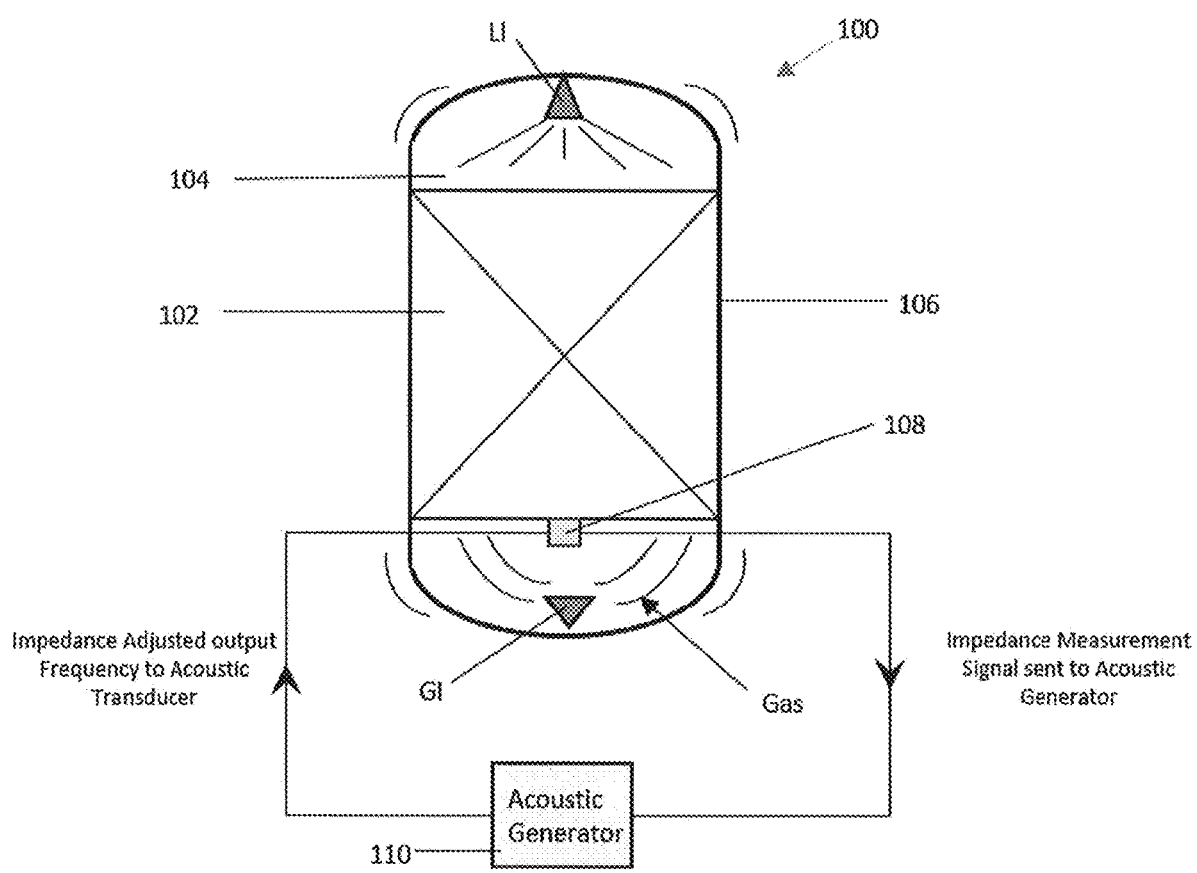

FIG. 11 is a schematic representation of one possible apparatus useful in a method of enhancing the yield and transfer rates of a packed bed in a reaction chamber of a vessel.

Figure 12:
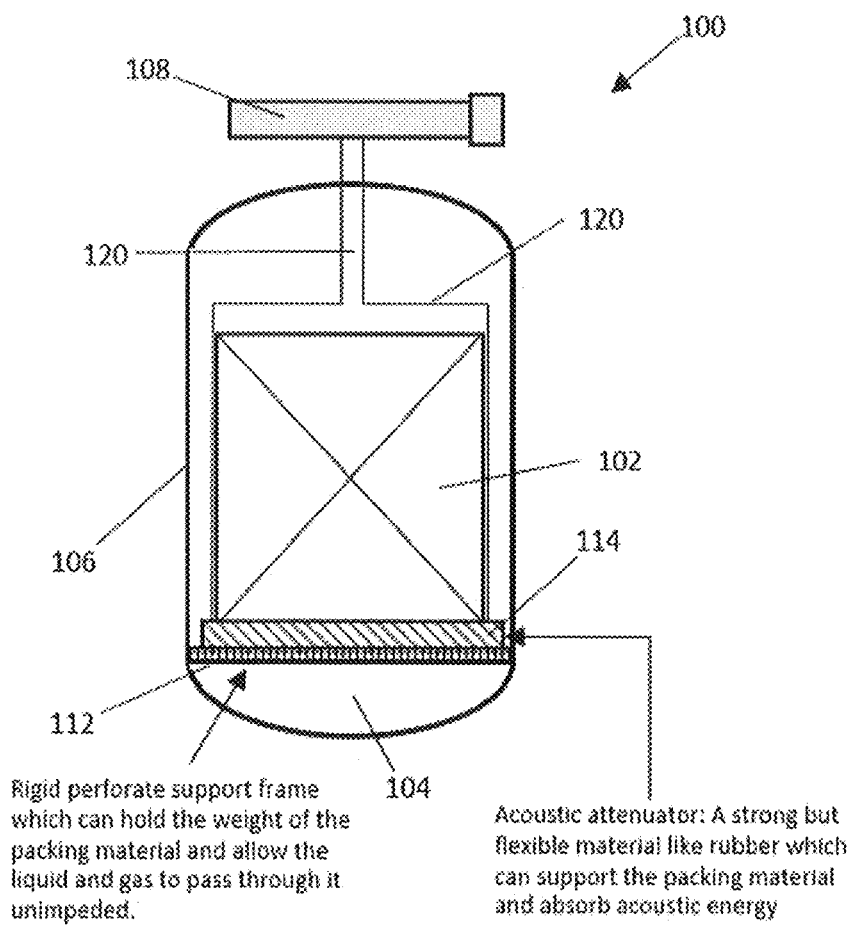

FIG. 12 is a schematic representation of one possible embodiment of the apparatus of FIG. 11 wherein the packed bed rests upon an acoustic attenuator carried by a support frame fixed to the wall of the vessel.

Figure 13:
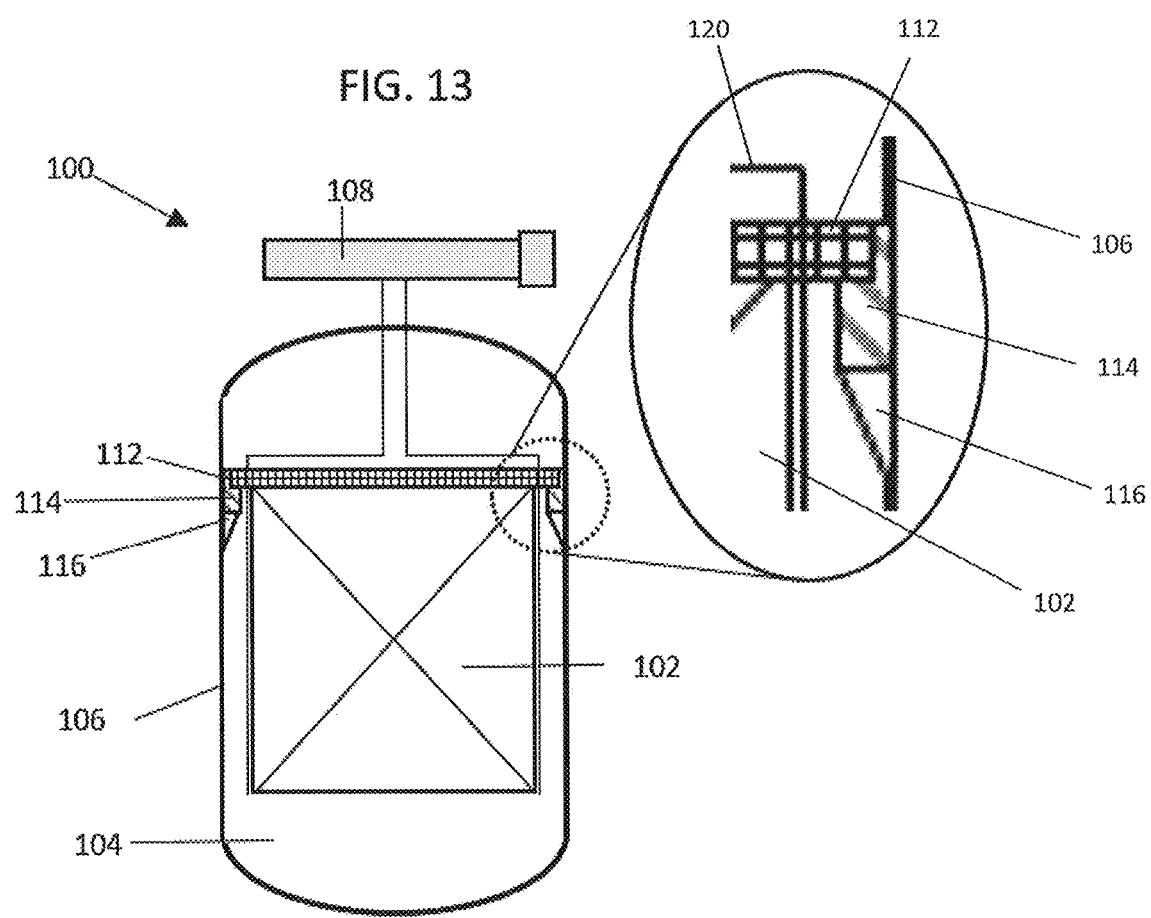

FIG. 13 is a schematic representation of another possible embodiment of the apparatus of claim 11 wherein the packed bed hangs from a support frame that is connected to the wall of the vessel by an acoustic attenuator.

Figure 14:
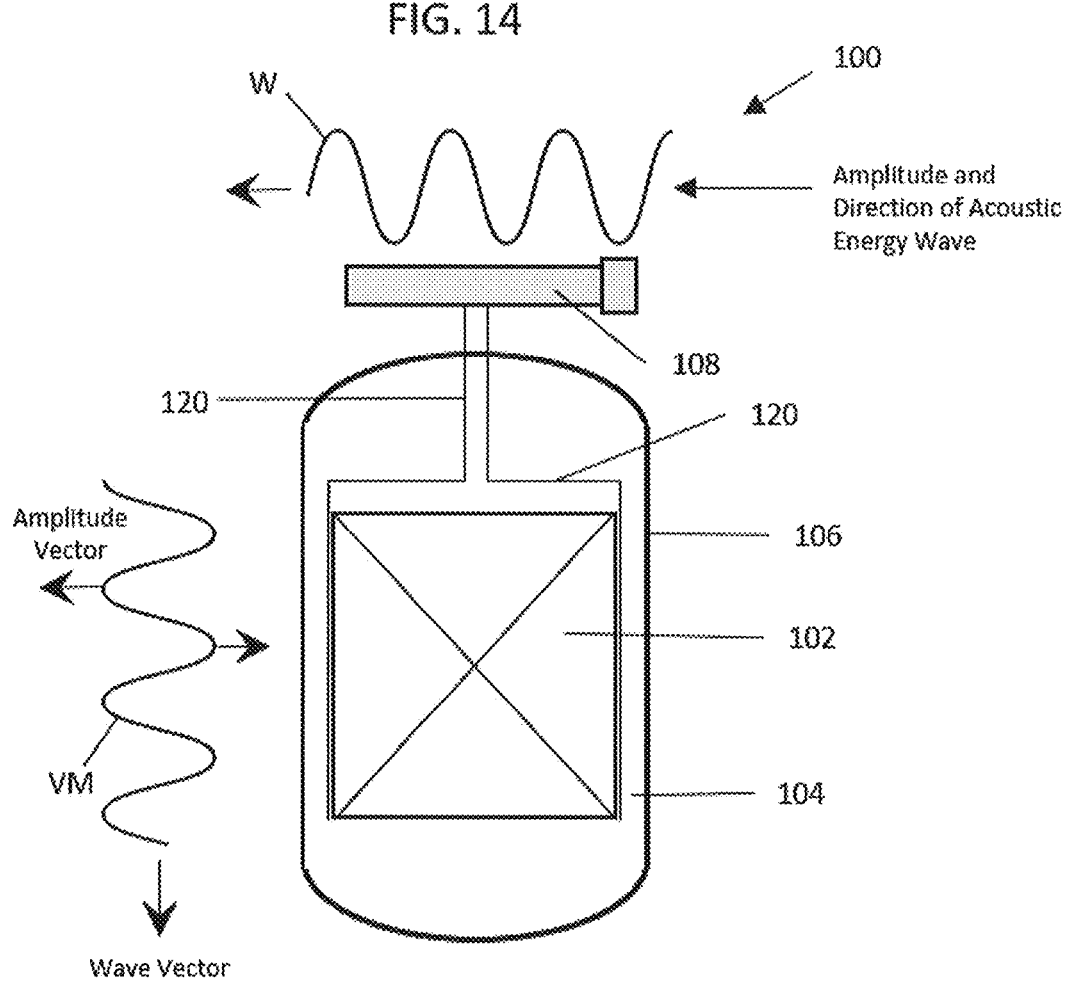

FIG. 14 illustrates an embodiment of the apparatus wherein acoustic energy is applied transversely across the packed bed by an acoustic transducer located outside of the vessel above the packed bed.

Figure 15:
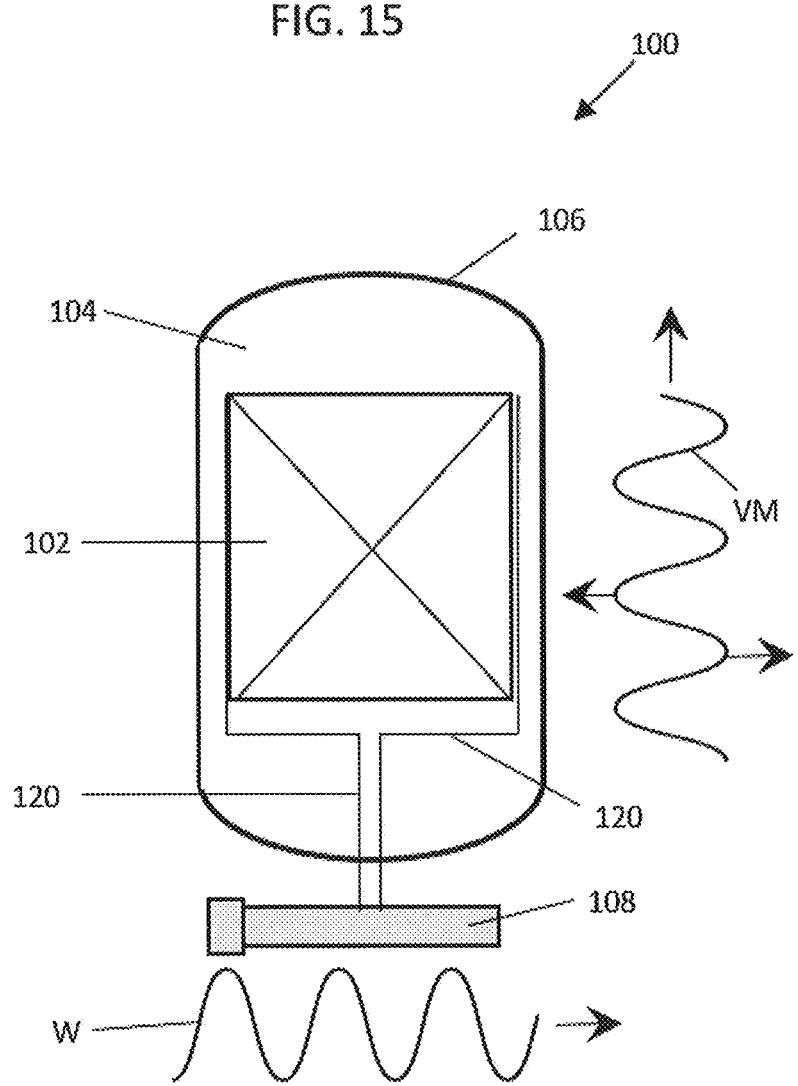

FIG. 15 illustrates an embodiment of the apparatus wherein acoustic energy is applied transversely across the packed bed by an acoustic transducer located outside of the vessel below the packed bed.

Figure 16:
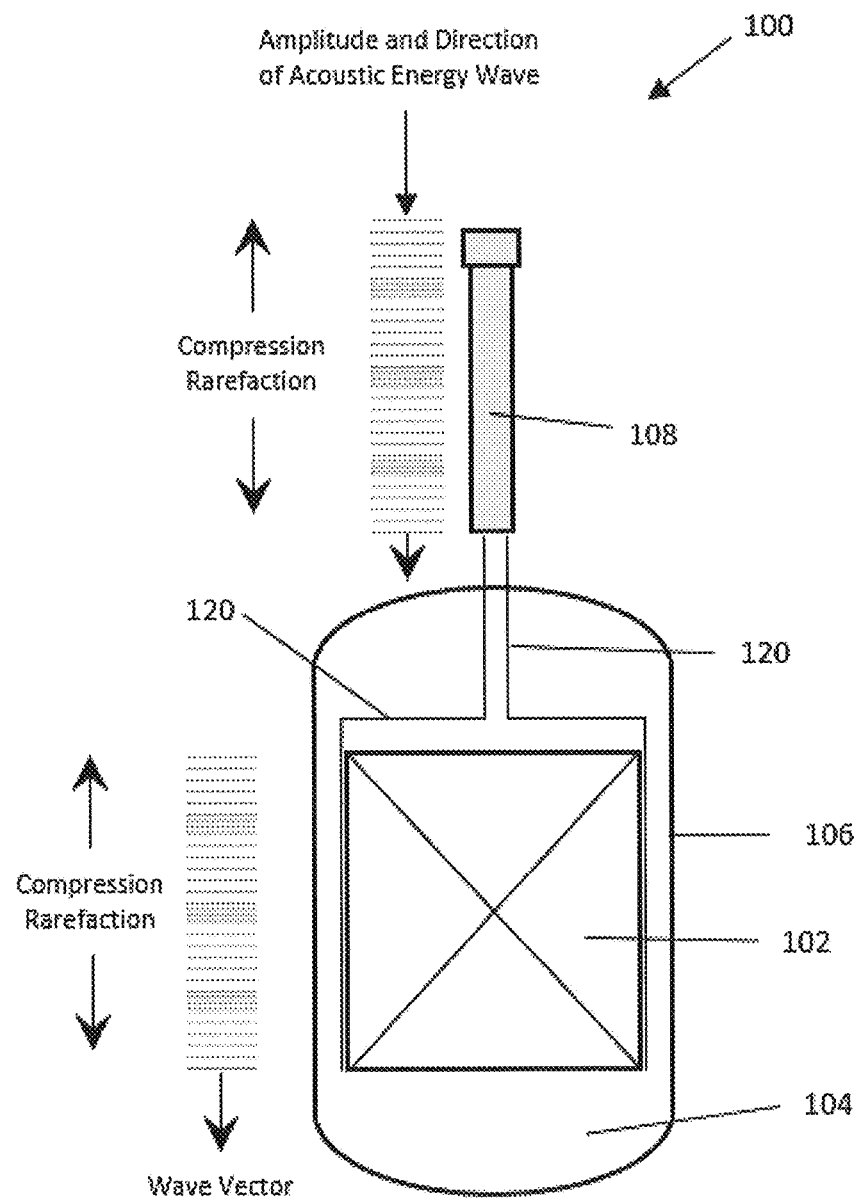

FIG. 16 illustrates an embodiment of the apparatus wherein acoustic energy is applied longitudinally along the packed bed by an acoustic transducer located outside of the vessel above the packed bed.

Figure 17:
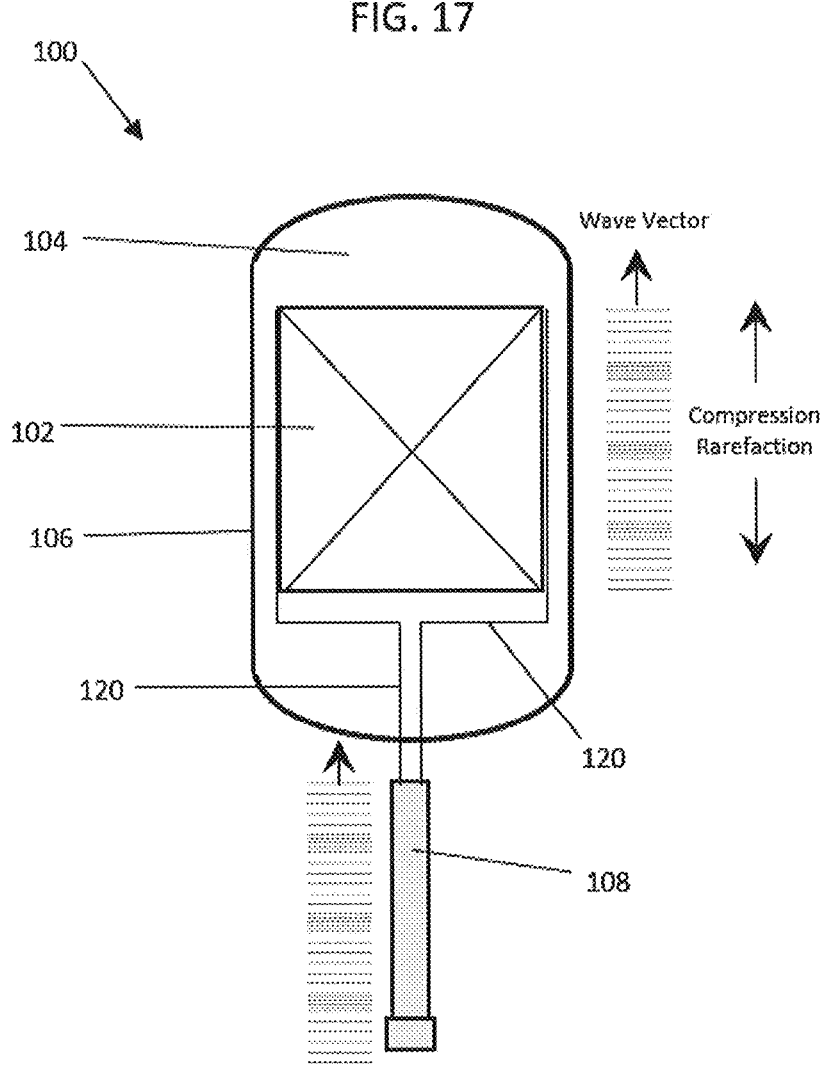

FIG. 17 illustrates an embodiment of the apparatus wherein acoustic energy is applied longitudinally along the packed bed by an acoustic transducer located outside of the vessel below the packed bed.

Figure 18:
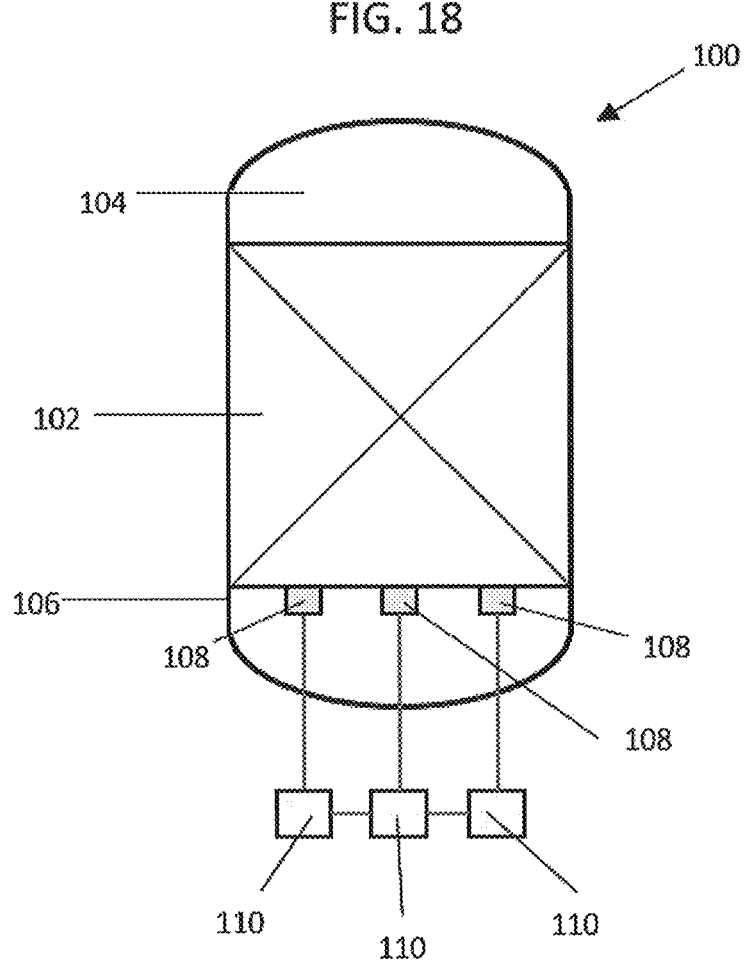

FIG. 18 illustrates an embodiment of the apparatus wherein multiple acoustic transducers connected to the bottom of the packed bed are connected to multiple acoustic generators located outside of the vessel.

DETAILED DESCRIPTION

The invention herein is a novel development to improve any separation system comprised of application of sonic energy to a packed bed. The application of sonic energy to the packed bed improves yield or rates. Any system that features a two phase reaction (liquid, gas, solid) and utilizes amount available surface area to affect yields or rate benefits from this development. This invention applies to general absorption systems, distillation systems, adsorption systems, stripping systems, as well as to systems that sequester other products such as acids from exhaust stream (general separation processes).

The introduction of sonic transducers to a packed bed further provides a novel carbon capture system and method for increasing $CO_2$ absorption rate. The invention comprises introduction of a sonic transducers within an absorber column of a carbon capture system. An absorber typically counterflows a gas source against an amine rich solvent to remove the carbon dioxide from the source. Within the absorber are at least two packed beds, separated by a liquid collector and a liquid redistributor. At the packed bed toward the gas inlet end is a gas distributor and a sump and near the gas outlet is a further liquid distributor. The invention herein introduces sonic transducers within the packed beds that provide mechanical oscillations of between 1 and 100 kHz or 20-40 kHz and improve $CO_2$ capture efficacy.

The sonic transducers may be placed within or around the packed bed. The sonic transducers may be affixed to an outer surface of the packed bed, such as the sides, roof or floor thereof. Placement of the sonic transducers may be based on the acoustics to be generated throughout the absorber tower and system upon activation of the transducers. Those skilled in the art will appreciate that the sonic transducers may initiate any bandwidth or frequency and cause some agitation of the packed bed and thereby improving mass transfer, absorption, and/or chemical reaction. The sonic transducers, in some instances, may provide an ultrasonic energy.

The packed bed may comprise any material and arranged in a number of manners, such as randomly, in plates, structured or combinations of both. In some instances, a packed bed may also comprise a case to contain the packing material. Those skilled in the art will appreciate that choice of packing material and arrangement may be varied based on solvents used, desired flow rates and overall preferred outcome from the system. In some instances, the packed bed may include carbon particles, such as activated carbon particles.

The introduction of sonic transducers increases the chemical reaction rate, mass-transfer, absorption rate of solvents used in absorption processes thereby decreasing capital equipment costs for the overall process or operational costs, depending on configuration. This increase is achieved by applying sonic vibration (1 Hz-40 kHz or more) to absorber packing materials. Preliminary testing of sonication on amine based solvents used in $CO_2$ capture processes has shown significant positive results. Initial experiments were carried out at the lab scale and then scaled up to a miniature version of an industrial carbon capture process. The increase in mass-transfer due to sonic energy on the solvent had no diminishing returns when brought to a larger scale of testing. Although the testing was done on amine based solvents for carbon capture, the technology is not limited to only that specific type of absorption process. Sonic enhanced packing material is applicable to any process that uses packing material to provide extra surface area to increase mass-transfer, absorption, and/or reaction rate.

By increasing the mass-transfer rate, amine solvents could capture equivalent amounts of $CO_2$ in shorter tower heights, lowering the overall capital costs of full scale deployment. Structured or random packing material outfitted with sonic transducers can propagate sonic waves through its medium and transfer that sonic energy into the solvent on its surface, see FIG. 2. This would sonicate the solvent as it travels down the absorber column causing micro level turbulence and acoustic streaming to form in the liquid-film. Any device or method that can effectively transfer sonic energy into the gas or liquid will cause this effect. Direct transfer into the liquid phase will yield the greatest increase in mass-transfer, absorption, and/or reaction rate.

The benefits of sonication are additive. For example, if sonication is paired with a high-surface area solid micro particle additive the mass-transfer rate will increase from both, but will cap at the physical kinematic rate limit of the solvent. A larger mass-transfer rate also has the added benefit of allowing solvents to reach higher loadings which would reduce operational costs associated with stripping the solvent. Lastly, this technology can help counteract the negative effects of channeling, which occurs when the solvent is not utilizing the full surface area provided by the packing material.

Sonic energy and activated carbon particles generate "micro-turbulence" which cases stirring and mixing on the micrometer scale. Lab and bench scale tests done so far only show that the effect is real, beneficial, energy efficient, and yet undiminished by initial scale up. These tests used commercially available sonic transducers, that work by sending an electrical signal to a transducer that transforms that signal into mechanical oscillations and operate between 20-40 kHz.

Any packed bed, used in absorption processes, could see benefits from sonic energy. Every solvent is different, and faster solvents may or may not see the same benefits from sonic energy that a slower solvent would see. Improvement is based on the physical absorption rate limit. But, generally, a slower solvent would see an improvement that is proportional with its reaction kinetics.

Figure 1:
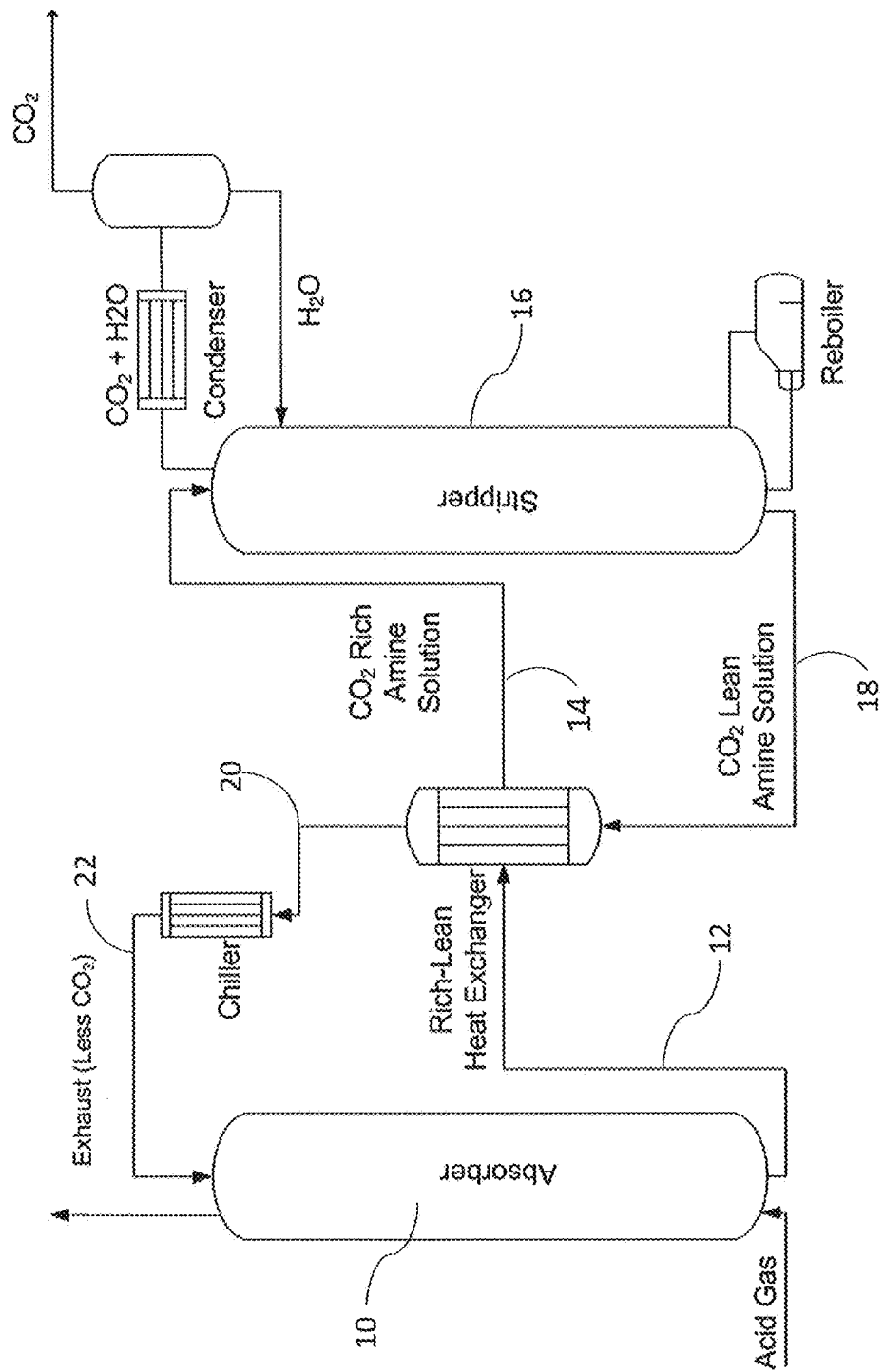
FIG. 1 shows a generalized schematic of post combustion $CO_2$ capture process using aqueous amine solvent.
Figure 2:
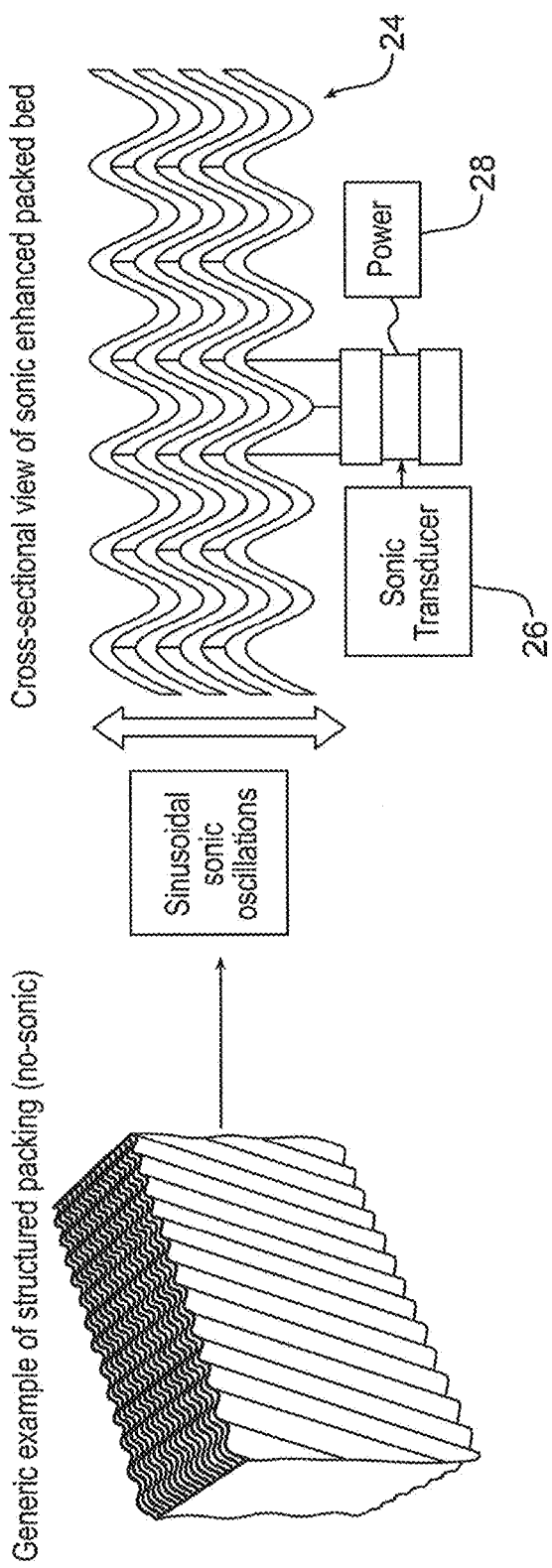
FIG. 2 shows (left) a picture of packing material that one might find in a packed bed: it has no sonic attachments; (right) shows a two dimensional depiction of how this packing material could be sonically enhanced.

Packing material comes in many shapes and sizes and any of them can be sonically enhanced. FIG. 2 shows a basic illustration of some dense metal packing material 24 and attached to it is a sonic transducer 26. When power is applied to the transducer, the piezoelectric device will oscillate, and because it is attached to the packing, sonic energy will be transferred into the intricately woven metal sheets and any liquid that comes in contact with the material will become sonicated. The metal sheets will oscillate at or near the frequency of the sonic transducer. As the distance from the transducer increases, the frequency of the oscillations may fall out of phase with the oscillator or the amplitude of the incident mechanical wave could diminish. To combat this, multiple sonic transducers can be spread out equidistant from each other to ensure even power and frequency distribution. A power supply 28 that can automatically measure the resonance frequency of the packing material and make frequency adjustments to the output transducer is optimal for this application.

Figure 3:
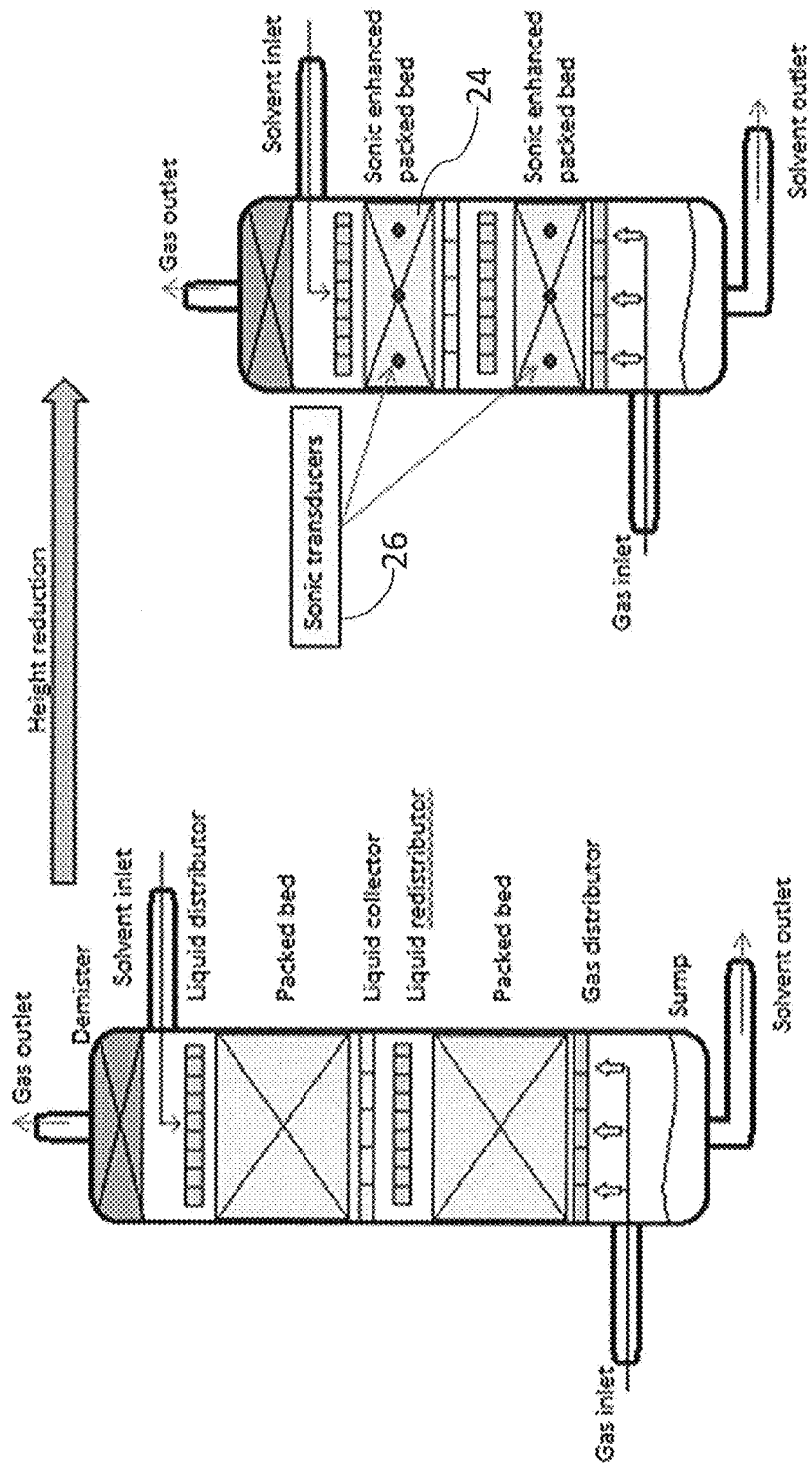
FIG. 3 shows an illustration of how sonic enhanced packed beds could reduce the size of packed bed columns. By sonicating the packing material in the column, the total amount of packing material needed can be reduced while still achieving the same output.

When this novel technology is applied to an entire packed bed 24, the overall height of the tower can be reduced, as depicted in FIG. 3, which would lower construction costs. If a process already exists, retro-fits with this technology may provide additional costs savings due to the increase achieved in the overall efficiency of the absorption process. Testing so far has yielded up to a 21%-25% increase in mass-transfer rate/reaction rate. This increase is dependent on solvent loading, liquid to gas ratios, total surface area being sonicated, pairing with micrometer sized activated carbon additive, and type of solvent being used.

Sonication acts on the diffusivity of a gas into liquid. As seen in equation (1) where k=reaction rate, $D_{gas}$=diffusivity, [Am]=amine concentration, $H_{gas}$=Henry's constant, and $K_g'$=mass-transfer. As $D_{gas}$ increases due to active sonication so does mass-transfer. Acoustic waves propagating through a thin film will generate acoustic streaming and capillary waves. This is what increases the surface area of the liquid film and therefore absorption rate, mass-transfer, and/or reaction rate.

$$k_g' = \frac{\sqrt{kD_{gas}[Am]}}{H_{gas}} \quad (1)$$

EXAMPLES

Figure 4:
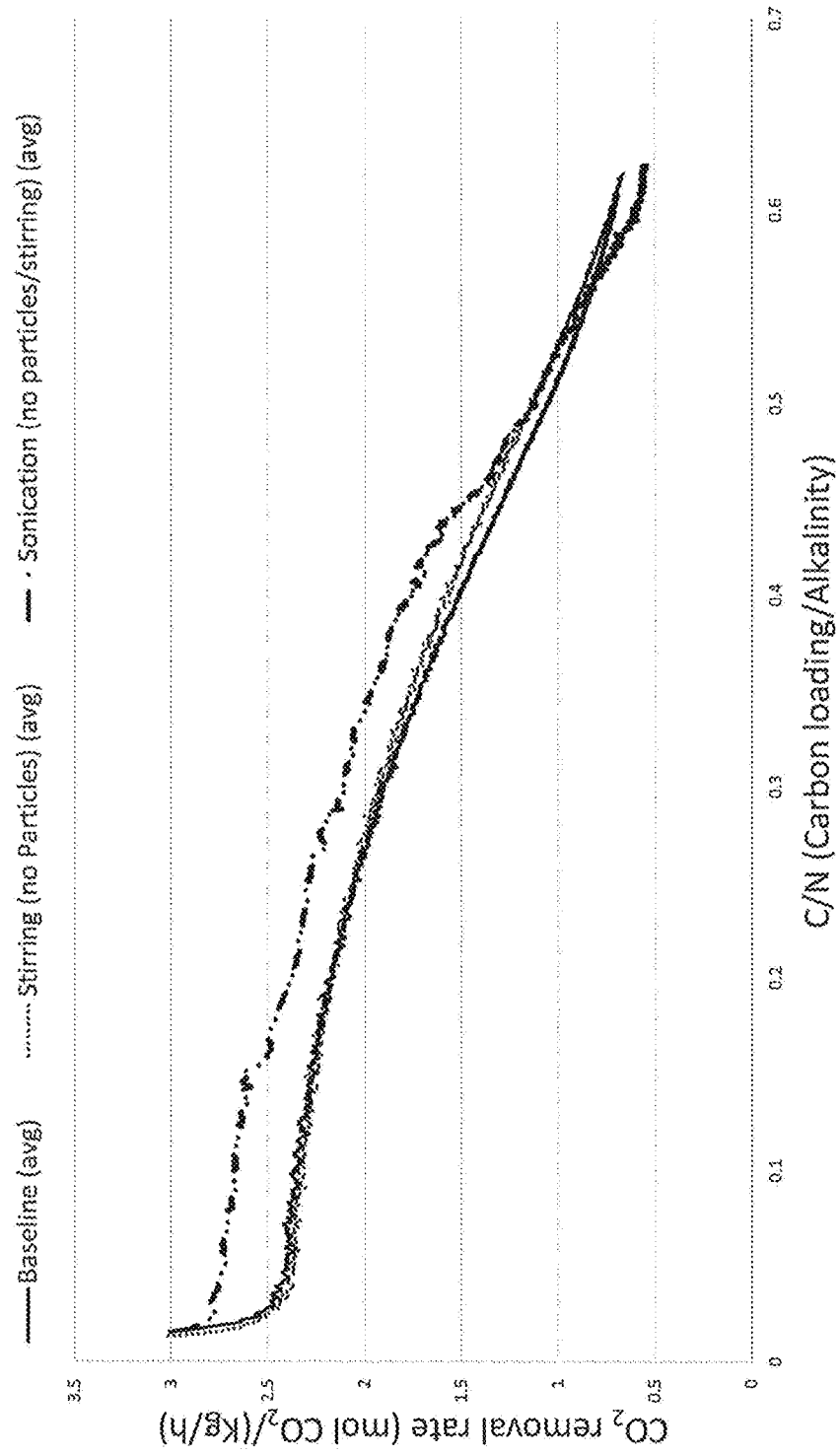
FIG. 4 shows that active sonication shows an increase up to 12% in $CO_2$ removal rate over the baseline, while stirring has no effect.

Initial lab scale 'proof of concept' testing for sonication was carried out using 30 wt % monoethanolamine (MEA) in a round bottom flask equipped with an overhead stirrer and a Horiba $CO_2$ gas analyzer. A constant 14% $CO_2$ 86% $N_2$ gas stream was fed into the round bottom flask containing the 30 wt % MEA. Baseline data was gathered without sonication followed by active sonication. Percent concentration of $CO_2$ was measured going into and out of the flask. As the gas passed over the solvent, $CO_2$ was transferred in into the MEA by means of a chemical reaction (absorption), lowering the overall $CO_2$ concentration in the gas outlet stream. The outlet measurement of $CO_2$% gives a quantitative understanding of the solvents absorption performance. As shown in FIG. 4 we see that there is an increase in solvent loading over the baseline measurements when the solvent is actively sonicated.

Figure 5:
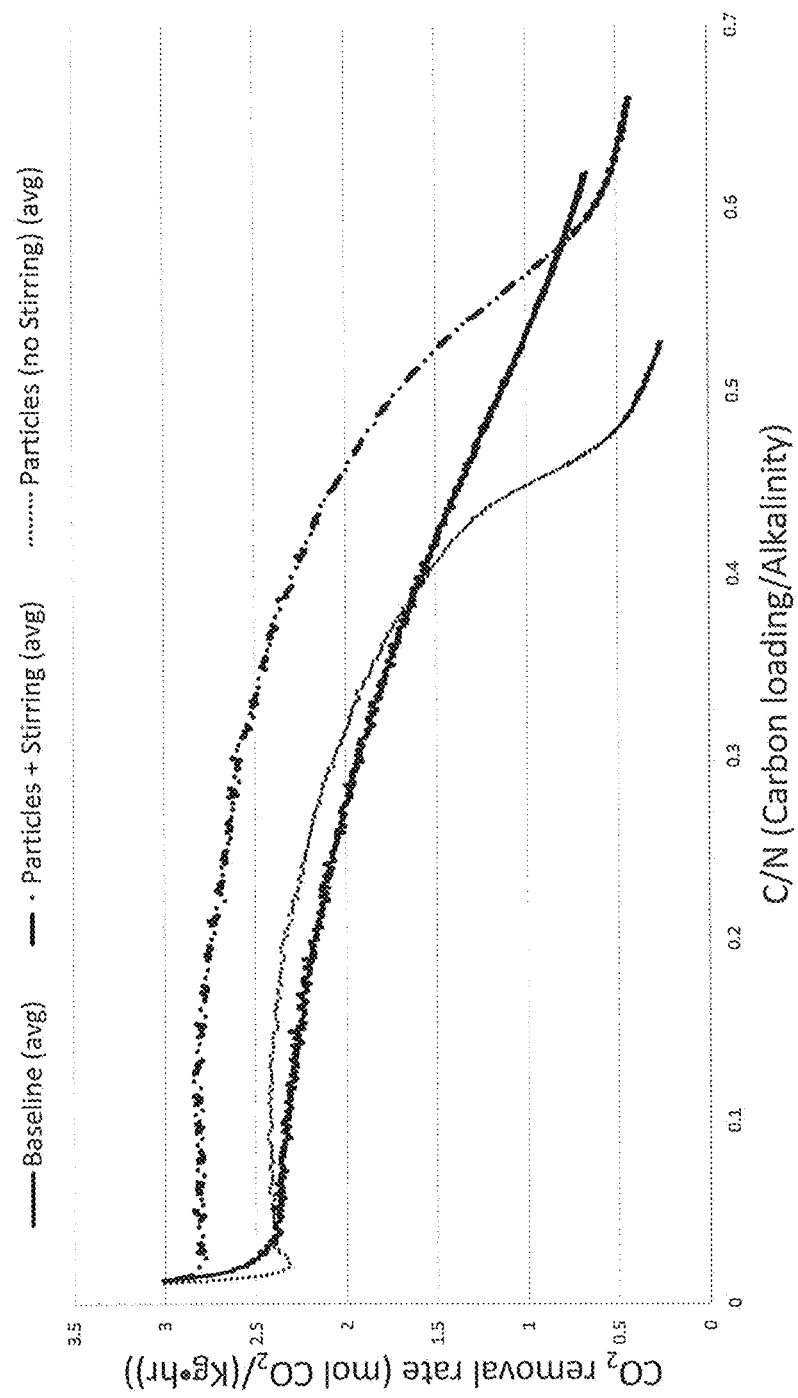
FIG. 5 shows adding the 1 wt % activated carbon to the solvent increased the $CO_2$ removal rate by 36%-43% while stirring. It had little to no effect without stirring.

Sonication was looked at as a way to improve the scalability of other current and emerging technologies. One such technology is the use of micrometer size activated carbon particles as a solid additive for solvents. The idea is that the particles will help create turbulence on a micro scale. As shown in FIG. 5, the activated carbon additive does increase mass-transfer and it looks promising on the lab scale. However, once brought to a larger scale, as evident in FIG. 9, the positive effects begin to drop off.

Figure 6:
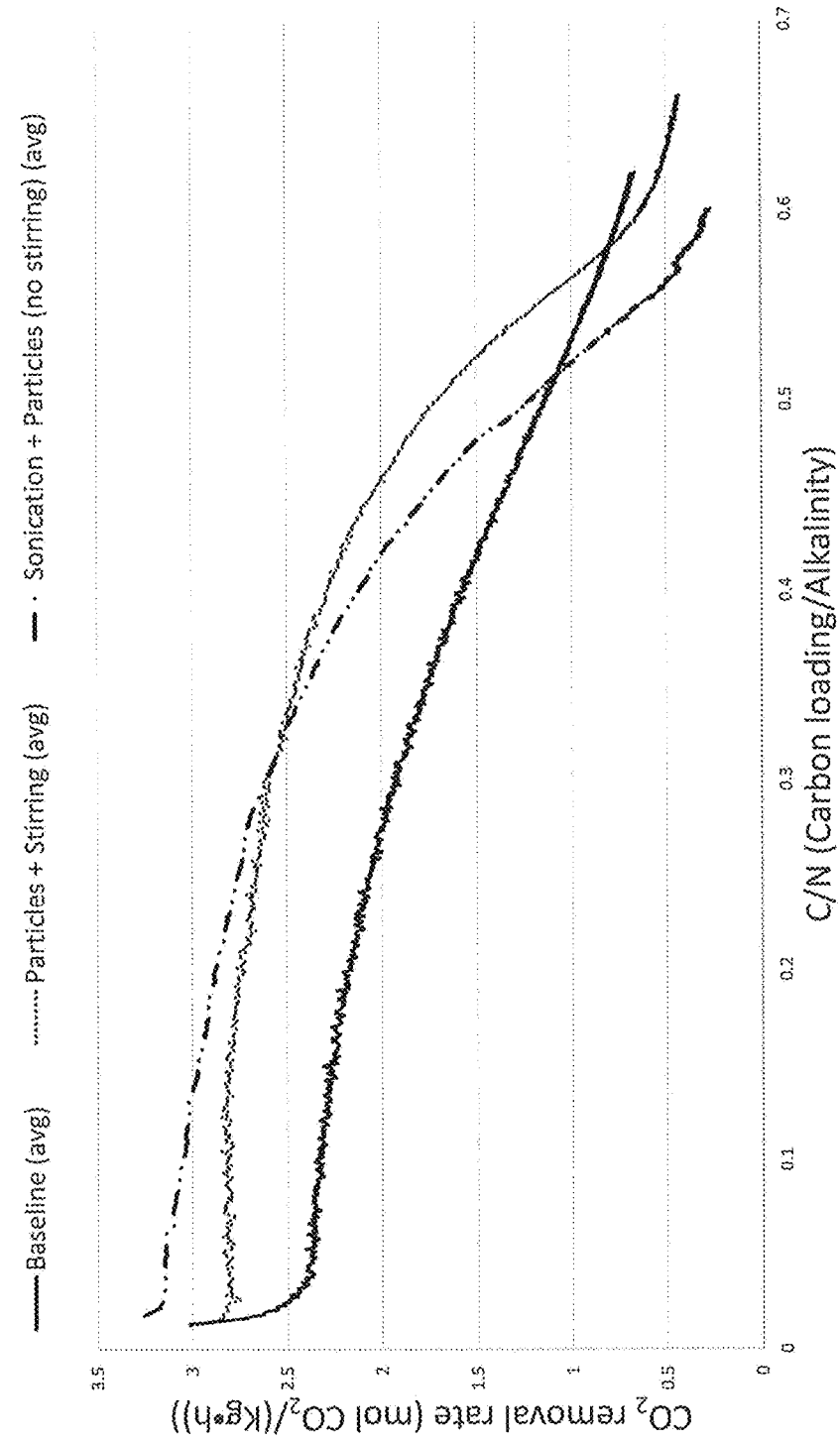
FIG. 6 shows both the stirring experiment and sonicating experiment show an increase of 36%-43% $CO_2$ removal rate over the baseline.

On the lab scale, testing of activated carbon additives was done using an identical setup as the sonication experiment. The key difference was the use of a stir bar spinning at about 150 rpm. This spinning churns the particles in the flask exerting a large amount of force on them, preventing them from settling, and causing them to become turbulent. When scaled up and used in a packed absorber column the particles lose effectiveness because there is no longer a strong force applied to them. If the particles are to retain their effectiveness, then there needs to be a strong force similar to the stir bar that can be integrated into an absorber column. This is where sonication becomes very useful, because it can effectively sonicate the packed beds of the absorber column and bring that stirring force to the particles, making them effective again. FIG. 6 shows testing done on the lab scale which shows that sonication can mimic the effects of stirring. Testing done on MEA with activated carbon (while stirring) matches tests done were the stirring was replaced with sonication.

Scale Up

Based on the lab scale results, the technology was scaled up from a flask to a small absorption column with a similar experimental setup to the lab scale. This absorption column uses random packing which consists of many small ceramic hollowed cylinders. In addition to the packing material, a sonic probe was inserted into the top of the column with its tip reaching the center of the packing material. FIG. 7 shows a drawing and photos of the absorption column. Each test circulated 1000 g of 30 wt % MEA through the absorption column at 150 ml/min with a gas flow of 17.1 L/min containing 14% $CO_2$ and 86% $N_2$. Pack bed depth was 10" with a 2" diameter.

The probe reaches halfway into the packing material as shown in FIG. 7 (*a*). One inch from the tip of the probe is the area of highest concentration of sonic energy and it diminishes quickly as the distance increases from the probe tip. When looking at the results from this experiment it is important to take into consideration that only a small amount of packing material is being sonicated, which means that any increase in absorption can be further increased by sonicating the entire packed bed.

First testing was done using 30 wt % MEA without activated carbon particles at 100% and 25% sonic probe power output. FIG. 8 shows that there is a 9-10% increase in capture efficiency at 25% power output (187.5 W) and a 14-16% increase at 100% power output (750 W). These results are similar to what was seen in FIG. 4 and is evidence that the sonication technology is yet unaffected by the experimental scale up.

FIG. 9 shows us some astounding results. The experiments were carried out with the addition 1 wt % oven oxidized activated carbon and active sonication at 100%, 25%, and 20%. A new baseline (no sonication) shows that there is an increase of 12%-13% in capture efficiency with just the addition on activated carbon particles. This is a decrease from what was seen in FIGS. 5 and 6. When active sonication is applied to the packed bed, with the addition of activated carbon particles, the capture efficiency is increased by 21%-25% from the baseline.

From the lab scale results we see that stirring or sonicating solvent containing activated carbon produced similar positive results. But when scaled up to an absorber column, stirring is no longer available which is why the effectiveness of the activated carbon particles is lower compared to the lab scale tests. Sonication, which can increase mass-transfer on its own, can be combined with active carbon in a packed bed absorption column to increase physical mass-transfer higher than their individual effects.

Second Set

A further experiment was designed to test the effects of sonic energy on a single 2-inch diameter segment of 700Y or 500Y structured packing material. The objectives for these tests are to (i) show that structured packing material can act as a sonic transmission source and (ii) provide an increase in mass-transfer, as seen in pervious experiments. Overall, these studies will provide a starting point in designing sonic packing for larger units.

The final plan for the new sonic experimental apparatus was finalized and the experimental set up constructed, see FIG. 10. A variable power 750 W sonic probe was used to transmit sonic energy into a single segment of 700Y structured packing material. The packing material itself rests on a recessed shelf of schedule 80 clear PVC and is 'free hanging'. It is important, at least for this experiment, that the packing material have as little contact with its surroundings as possible. Every point of contact is a potential gain in total attenuation, which will lower the amount of sonic energy transmitted into the solvent. The point at which the sonic transmission rod enters the column is sealed with a compressed gasket and is located at a transmission node, a position on the rod which has zero sonic amplitude.

Bottled $CO_2$ was diluted with house $N_2$ to obtain a concentration of 14% $CO_2$ and sent to the absorber at flow rate of 14.1 L/min. Solvent circulation rate was set to 150 ml/min and the absorber inlet temperature was kept at 40° C. Exit $CO_2$ concentration was measured and from that a $CO_2$ removal rate was calculated, a higher rate will indicate an increase in mass-transfer. All testing was done using 30 wt % monoethanolamine (MEA). Of the few experiments that were performed to test the effects of sonic packing with solid additives, 1 wt % oven oxidized 1-44 micron activated carbon was added to the solvent.

Resonance

The variable power 750 W sonic probe operates at a resonance frequency of 28 kHz. This frequency is set by the dimensions of the transducer and their electrical drivers are designed to output power at that specific frequency. In order for the transducer to stay in resonance with the electrical driver, the object it is transmitting sonic energy into must have a length that is a half or whole multiple of its wavelength. As a consequence, the total length of the transmission rod and free hanging packing material must be a multiple of that wave length. A way around this is to measure the resonance frequency of the transducer with added packing material and change the circuitry in the driver to output the new measured resonance frequency. Measuring resonance can be done by connecting the sonic transducer to a function generator in series with a resistor. An oscilloscope can then display input frequency and transducer response voltage. There are commercial units which can automatically measure resonance and auto adjust output frequency to match it.

Results and Discussion

The physical mechanism that increases mass-transfer in a solvent under the effects of sonication is acoustic streaming. As the compression wave generated at the sonic transducers head travels through the packing material and into the liquid film, it causes the film surface to ripple, oscillate, and form capillary waves at its surface. This increases surface area and therefore mass-transfer. However, if the amplitude of the compression wave is not strong enough then there is no increase in mass-transfer. An amplitude that is too small could be the result of the sonic transducer being out of resonance or a high amount of attenuation.

Structure Packing Material

It is known that the application of sonic energy to a liquid film increases $CO_2$ mass-transfer in gas-liquid amine based processes. Previously collected data, using monoethanolamine (MEA), showed an increase in mass-transfer up to 13% and up to 24-40% with the addition of 1 wt % 1-44 micron activated carbon. Of interest are the effects of acoustic energy on a solvent when used with structured packing and how to effectively scale this technology up to the large bench experiment. A few initial tests have been carried out on the new mini-bench scrubbing unit.

This new experiment is designed to test the effects of sonic energy on a single 2-inch diameter segment of 700Y or 500Y structured packing material. The objectives for these tests are to (i) show that structured packing material can act as a sonic transmission source and (ii) provide an increase in mass-transfer, as seen in pervious experiments. Overall, these studies will provide a starting point in designing sonic packing for the large bench unit.

Experimental

The final plan for the new sonic experimental apparatus was finalized and the experimental set up constructed. A variable power 750 W sonic probe were used to transmit sonic energy into a single segment of 700Y structured packing material. The packing material itself rests on a recessed shelf of schedule 80 clear PVC and is 'free hanging'. It is important, at least for this experiment, that the packing material have as little contact with its surroundings as possible. Every point of contact is a potential gain in total attenuation, which will lower the amount of sonic energy transmitted into the solvent. The point at which the sonic transmission rod enters the column is sealed with a compressed gasket and is located at a transmission node, a position on the rod which has zero sonic amplitude.

Bottled $CO_2$ was diluted with house $N_2$ to obtain a concentration of 14% $CO_2$ and sent to the absorber at flow rate of 14.1 L/min. Solvent circulation rate was set to 150 ml/min and the absorber inlet temperature was kept at 40° C. Exit $CO_2$ concentration was measured and from that a $CO_2$ removal rate was calculated, a higher rate will indicate an increase in mass-transfer. All testing was done using 30 wt % monoethanolamine (MEA). Of the few experiments that were performed to test the effects of sonic packing with solid additives, 1 wt % oven oxidized 1-44 micron activated carbon was added to the solvent.

Resonance

The variable power 750 W sonic probe operates at a resonance frequency of 28 kHz. This frequency is set by the dimensions of the transducer and their electrical drivers are designed to output power at that specific frequency. In order for the transducer to stay in resonance with the electrical driver, the object it is transmitting sonic energy into must have a length that is a half or whole multiple of its wavelength. As a consequence, the total length of the transmission rod and free hanging packing material must be a multiple of that wave length. A way around this is to measure the resonance frequency of the transducer with added packing material and change the circuitry in the driver to output the new measured resonance frequency. Measuring resonance can be done by connecting the sonic transducer to a function generator in series with a resistor. An oscilloscope can then display input frequency and transducer response voltage. There are commercial units which can automatically measure resonance and auto adjust output frequency to match it.

Results and Discussion

The physical mechanism that increases mass-transfer in a solvent under the effects of sonication is acoustic streaming. As the compression wave generated at the sonic transducers head travels through the packing material and into the liquid film, it causes the film surface to ripple and oscillate. This increases surface area and therefore mass-transfer. However, if the amplitude of the compression wave is not strong enough then there is no increase in mass-transfer. An amplitude that is too small could be the result of the sonic transducer being out of resonance or a high amount of attenuation.

Reference is now made to FIGS. 11-18 which schematically illustrate various apparatus 100 useful in a method of enhancing the yield and transfer rates of a packed bed 102 in a reaction chamber 104 of a vessel 106. Such packed beds 102 may be used in counter current towers/columns/reactors, two phase reactions wherein the process reaction rate is proportional to reaction surface area. In the illustrated embodiment, note the liquid inlet LI at the top of the vessel 106 and the gas inlet GI at the bottom of the vessel.

As illustrated in FIG. 11, an acoustic transducer 108, of a type known in the art, is connected to the bottom of the packed bed 102 within the reaction chamber 104. An acoustic generator 110, of a type known in the art, is located outside of the vessel 106 and operatively connected to the acoustic transducer 108. The acoustic generator 110 has impedance matching functionality adapted to continuously derive a natural resonance frequency of the packed bed 102 within a frequency bandwidth of desired operation (e.g. 1 Hz to 50 KiloHertz) and then output a driving signal to the acoustic transducer at the derived resonance frequency and at a predetermined amplitude measured in power output (e.g. 1 watt to 100 kilowatts) whereby the yield and transfer rate of the packed bed is increased and potentially optimized.

Reference is now made to FIG. 12 which illustrates an embodiment of the apparatus 100 wherein the packed bed 102 rests on a support frame 112 and an acoustic attenuator 114 in the reaction chamber 104. More specifically, the packed bed rests directly on the acoustic attenuator 114 which, in turn, rests upon the support frame 112 that is fixed to the wall of the vessel 106. The support frame 112 may be made from any rigid perforated material which will support the weight of the packed bed and allow liquid and gas to pass through it unimpeded. The acoustic attenuator 114 may be made from any appropriately strong and flexible material adapted to isolate and allow the packed bed to vibrate freely in response to the acoustic energy being applied by the acoustic transducer 108 while resisting any transmission of vibration to the support frame 112 and the vessel 106. The acoustic attenuator must also allow liquid and gas to pass through it unimpeded. The acoustic attenuator may be made from rubber, flexible plastic, mechanical springs or other material that absorbs the acoustic vibrations thereby having a dampening effect sufficient to isolate the acoustic vibrations to the packed bed 102. This will also provide boundary conditions for the acoustic system.

Reference is now made to FIG. 13 which illustrates an embodiment of the apparatus 100 wherein the packed bed 102 hangs from the rigid, perforated support frame 112. The acoustic attenuator 114 is provided between the support frame 112 and a step or shelf 116 provided on the wall of the vessel 106 which supports the packed bed 102 within the reaction vessel while isolating the packed bed to allow for vibration in response to acoustic energy applied by the acoustic transducer 108. In both of the embodiments illustrated in FIGS. 12 and 13, sufficient clearance is provided between the packed bed 102 and the wall of the vessel to allow for the packed bed to vibrate freely in response to acoustic energy applied to the packed bed by the acoustic transducer 108 through the acoustic transmission lines 120 that may be welded to the packed bed. The only contact between the packed bed 102 and the vessel is 'soft contact' through the acoustic attenuator 114.

As illustrated in FIG. 14, the acoustic transducer 108 is located outside of the reaction chamber 104 and the vessel 106 above the packed bed 102. Acoustic transmission lines 120 connect the acoustic transducer 108 to the packed bed 102. In this embodiment, a transverse wave W of acoustic energy is applied by the acoustic transducer 108 to the packed bed 102 to generate vibratory motion VM in the packing material. FIG. 15 is similar to FIG. 14 except the acoustic transducer 108 is located outside of the reaction chamber 104 and the vessel 106 below the packed bed 102.

As illustrated in FIG. 16, the acoustic transducer 108 is located outside of the reaction chamber 104 and the vessel 106 above the packed bed 102. Acoustic transmission lines 120 connect the acoustic transducer 108 to the packed bed 102. In this embodiment, a longitudinal wave of acoustic energy is applied by the acoustic transducer 108 to the packed bed 102 to generate vibratory motion in the form of compression rarefaction in the packing material. FIG. 17 is similar to FIG. 16 except the acoustic transducer 108 is located outside of the reaction chamber 104 and the vessel 106 below the packed bed 102.

FIG. 18 illustrates another possible embodiment of the apparatus 100 wherein multiple acoustic transducers 108 are connected to the bottom of the packed bed 102 within the reaction chamber 104 of the vessel 106. Each of the acoustic transducers 18 is connected to its own acoustic generator 110 by an acoustic transmission line 120. Such a multiple acoustic transducer 108 and acoustic generator 110 network may be used for applications, for example, when the packed bed might be too large for a single acoustic transducer to function properly or where the packed bed might have multiple sections.

As indicated above, the apparatus 100 of FIGS. 11-18 is useful in a method of enhancing the yield and transfer rates of a packed bed 102 in a reaction chamber 104 of a vessel 106. That method may be broadly described as including the steps of: (a) applying acoustic energy to the packed bed 102, (b) measuring impedance of the packed bed, (c) deriving a natural resonance frequency for the packed bed from the measured impedance and (d) applying the acoustic energy to the packed bed at the derived natural resonance frequency of the packed bed.

More specifically, the acoustic generator 110 measures the total circuit impedance and derives the natural resonance frequency of the physical medium of the packed bed 102, within the frequency bandwidth of desired operation, and outputs a driving signal to the acoustic transducer 108 at the derived resonance frequency and desired, user chosen amplitude. The acoustic transducer 108 then expands and contracts at that frequency and amplitude generating an acoustic wave that travels down the physical medium. Any liquid in contact with the physical medium experiences capillary waves, acoustic streaming effects and increased surface area.

The method also includes the step of changing the frequency of the applied acoustic energy to match changes in the derived natural resonance frequency as indicated by changes in the measured impedance. More specifically, as the acoustic transducer 108 remains in operation, the natural resonance frequency of the physical medium of the packed bed 102 wobbles and shifts due to external forces such as changes in the mass of the physical medium as liquid and gas interact with it. Unattenuated acoustic feedback (or vibrations) from the environment can also cause shifts in the resonance frequency. The impedance matching functionality of the acoustic generator 110 continuously measures these changes and outputs updated frequencies to the acoustic transducer 108, keeping the transducer and physical medium in resonance.

The method also includes the step of acoustically isolating the packed bed 102 within the reaction chamber 104 of the vessel 106. In one possible embodiment illustrated in FIG. 12, this includes resting the packed bed 102 upon an acoustic attenuator 114 wherein the acoustic attenuator is carried on a support frame 112 fixed to the vessel 106. In another possible embodiment illustrated in FIG. 13, this includes hanging the packed bed 102 from a support frame 112 wherein an acoustic attenuator 114 is provided between the support frame and the vessel 106.

In either embodiment, the attenuator absorbs the acoustic energy being input by the acoustic transducer 108 so that only the physical medium and any reaction medium in contact with it, including any liquid or gas passing through the reaction chamber 104, is being acoustically driven by the transducer 108. Without this acoustic isolation, there would be a serious loss in efficiency, potential damage to external components and even possible failure of operation. If the physical medium is not properly attenuated then the feedback frequency could cause a change in natural resonance frequency so large that the acoustic generator 110 could not adequately account for it.

As illustrated in FIGS. 11 and 18, in some embodiments, the method includes the step of locating at least one acoustic transducer 108 in or on the packed bed 102 within the reaction chamber 104 of the vessel 106. As illustrated in FIGS. 14-17 in some embodiments, the method includes the step of locating at least one acoustic transducer 108 outside of the reaction chamber 104 and connecting said at least one transducer to the packed bed 102 by at least one acoustic transmission line 120.

The method may also include the step of applying the acoustic energy to the packed bed 102 in a desired direction. For example, as illustrated in FIGS. 14 and 15, the method includes the step of applying the acoustic energy to the packed bed 102 in a transverse direction across the packed bed and aligned with a transverse axis of the vessel 106. Alternatively, as illustrated in FIGS. 16 and 17, the method includes the step of applying the acoustic energy to the packed bed 102 in a longitudinal direction along the packed bed and aligned with a longitudinal axis of the vessel 106. The acoustic energy may also be applied in other directions (i.e. a direction between a transverse wave as illustrated in FIGS. 14 and 15 and a longitudinal wave as illustrated in FIGS. 16 and 17). The direction of the applied wave energy may be selected in order to optimize the yield and transfer rate for any particular application.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled. Further, all references cited herein are incorporated by reference in their entirety.

What is claimed:

1. A method of enhancing yield and transfer rate of a packed bed in a reaction chamber of a vessel, comprising:
applying acoustic energy to the packed bed;
measuring impedance of the packed bed;
deriving a natural resonance frequency for the packed bed from the measured impedance; and
applying the acoustic energy to the packed bed at the derived natural resonance frequency of the packed bed.

2. The method of claim 1, including changing a frequency of the applied acoustic energy to match changes in the derived natural frequency as indicated by changes in the measured impedance.

3. The method of claim 2, including acoustically isolating the packed bed within the reaction chamber of the vessel.

4. The method of claim 3, including applying the acoustic energy to the packed bed in a desired direction.

5. The method of claim 3, including applying the acoustic energy to the packed bed in a transverse direction across the packed bed.

6. The method of claim 3, including applying the acoustic energy to the packed bed in a longitudinal direction along the packed bed.

7. The method of claim 1, including resting the packed bed upon an acoustic attenuator wherein the acoustic attenuator is carried on a support frame fixed to the vessel.

8. The method of claim 1, including hanging the packed bed from a support frame wherein an acoustic attenuator is provided between the support frame and the vessel.

9. The method of claim 1, including locating at least one acoustic transducer in the packed bed within the reaction vessel.

10. The method of claim 1, including locating at least one acoustic transducer outside of the reaction chamber and connecting said at least one transducer to the packed bed by at least one acoustic transmission line.

11. The method of claim 1 wherein the vessel is an absorber tower and the method includes circulating an amine based solvent and a flue gas in counter-current flow through the packed bed in the absorber tower.

12. A method of enhancing yield and transfer rate of a packed bed in a reactor chamber of a vessel comprising:
   deriving a natural resonance frequency of the packed bed within a frequency bandwidth of desired operation; and
   outputting a driving signal to at least one acoustic transducer adapted to transmit acoustic energy into the packed bed at the derived natural resonance frequency and at a predetermined amplitude whereby the yield and the transfer rate from the packed bed is increased.

* * * * *